Patented Jan. 4, 1949

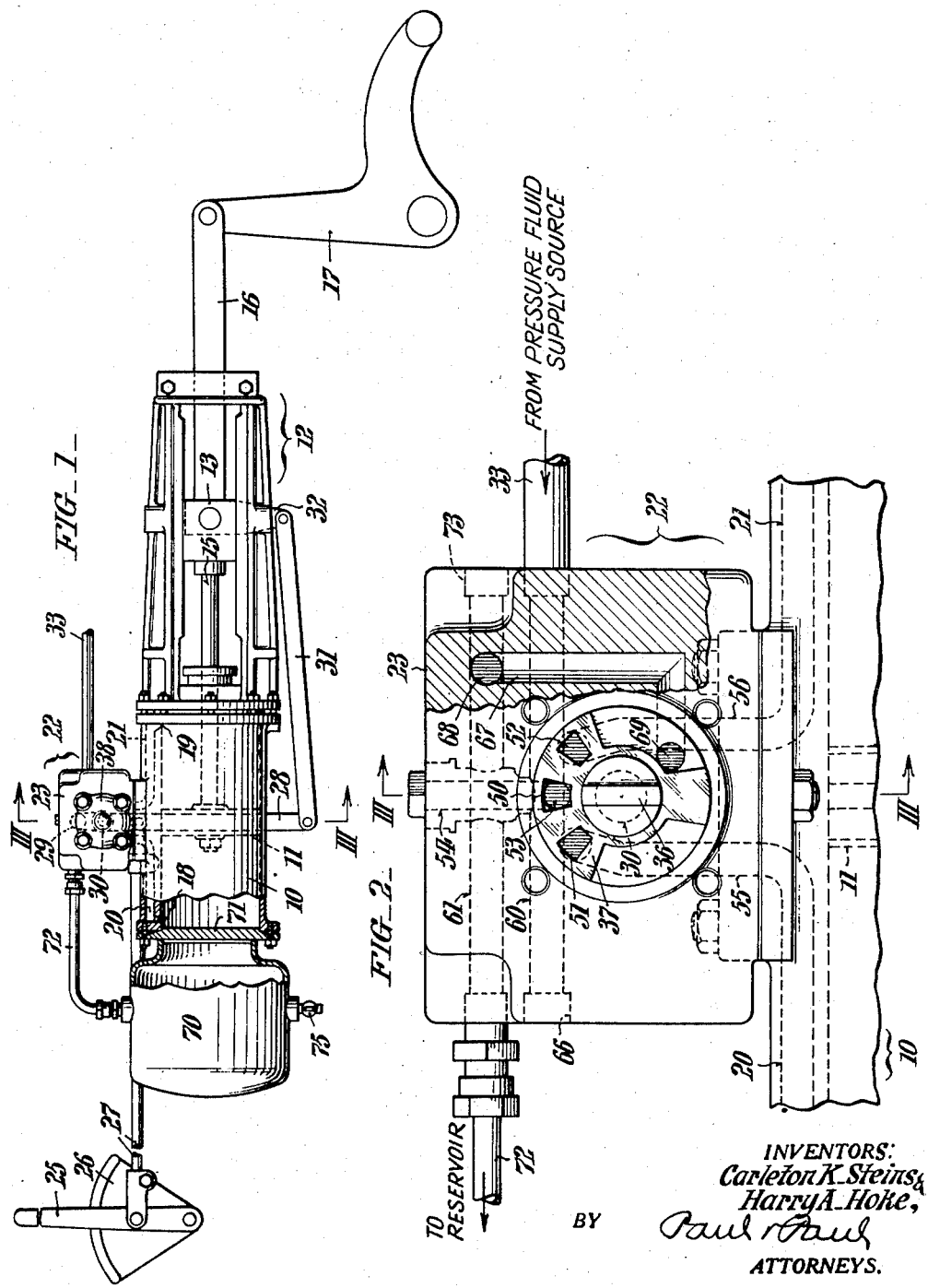

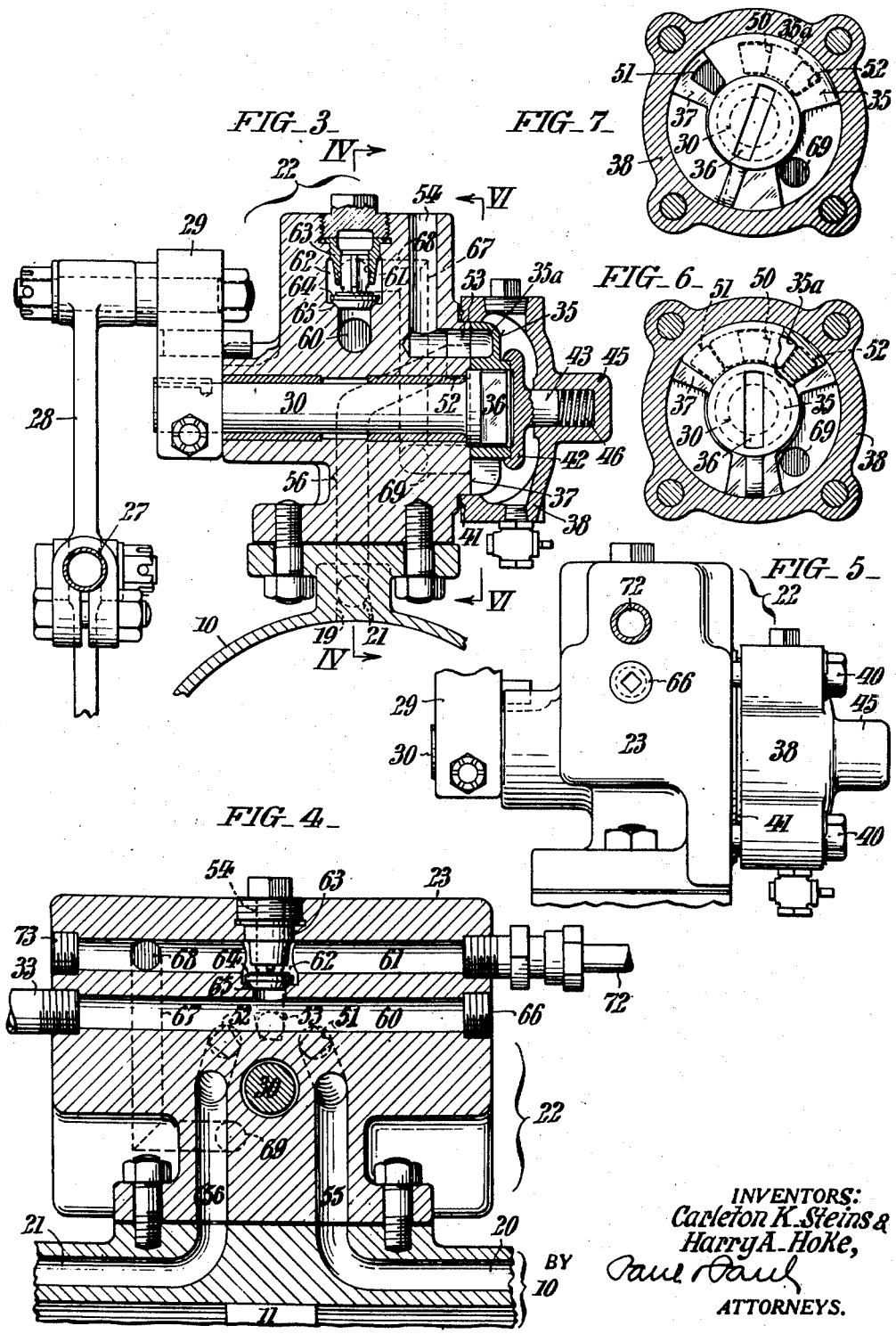

2,457,937

UNITED STATES PATENT OFFICE 2,457,937

FLUID MOTOR WITH EMERGENCY SUPPLY RESERVOIR

Carleton K. Steins, Merion, and Harry A. Hoke, Altoona, Pa., assignors to The Pennsylvania Railroad Company, Philadelphia, Pa., a corporation of Pennsylvania Application January 26, 1944, Serial No. 519,724

3 Claims. (Cl. 60—57)

This invention relates to power reverse gears for steam locomotives and the like, and has reference more particularly to power reverse gears of the pressure-fluid actuated type in which the shifting of the eccentric straps of the locomotive engine is accomplished by means of a double-acting cylinder under governance of a manually operable control unit.

Power reverse gears of the kind specifically referred to are rendered useless in the event of failure of the pressure-fluid supply, or of rupture of the piping leading from the source of such supply to the control unit.

Our invention has for its chief aim to obviate the above drawback, that is to say, to make possible at least two emergency operations of the gear in contingencies of the sort mentioned. This objective is attained in practice as hereinafter more fully disclosed, through provision of an auxiliary reservoir in which a quantity of the pressure medium is stored, and through modifications in the construction of the control unit of the reverse gear which will enable utilization of the reserve supply of the pressure medium for several emergency operations.

Other objects and attendant advantages will appear from the following description of the attached drawings, wherein Fig. 1 is a fragmentary view in side elevation of a power reverse gear for steam locomotives embodying our invention, portions of the organization being broken away and shown in section to more clearly illustrate important structural features which would otherwise be obscured.

Fig. 2 shows the front elevation of the control unit for the pressure-fluid cylinder of the reversing gear with certain parts removed and with a portion of the housing of said control unit broken away and sectioned.

Fig. 3 is a central cross sectional view taken as indicated by the angled arrows III—III in Figs. 1 and 2.

Fig. 4 is a fragmentary longitudinal section taken as indicated by the angled arrows IV—IV in Fig. 3.

Fig. 5 is a view looking from the left of Fig. 2 and showing the control unit in end elevation.

Fig. 6 is a detail sectional view taken as indicated by the angled arrows VI—VI in Fig. 3 and showing the valve element of the control unit in its normal position; and Fig. 7 is a view like Fig. 6 showing the valve element of the control unit in one of its shifted positions.

The power reverse gear chosen for convenience of exemplifying our invention is generally of well known construction, having a double-acting cylinder 10 with a piston 11 therein, and a guide 12 bolted to its forward end for a cross head 13 at the outer end of the piston rod 15. Through a link 16, motion is imparted from the cross head 13 to the usual eccentric rod lifting bell crank lever 17 of the locomotive. Pressure-fluid is admitted or exhausted from opposite ends of the cylinder 10 by way of ports 18 and 19 and connecting ducts 20 and 21 in the top of the cylinder wall under governance of a control unit generally designated 22, whereof the housing 23 is directly mounted on said cylinder. The actuating means for the control unit 22 includes an engineer's hand lever 25 which is fulcrumed to a stop quadrant 26, and a link 27 which extends from said lever to a floating arm 28 pivotally connected to the upper end of a short arm 29 fast on the rear protruding end of the shaft or stem 30 of the control unit 22, said floating arm being coupled by means of a link 31 with the usual cross head arm indicated at 32. Pressure-fluid is conducted to the control unit 22 from a suitable supply source (not shown) through a pipe 33. Also as ordinarily, the control unit 22 is provided with a sector-shaped valve element 35 which fits over the key end 36 (Fig. 3) of the stem 30, said valve element bearing against a machined seat 37 at the front of the housing 23 and being enclosed by a hollow cupped cover piece or cap 38 which is secured to said housing by a plurality of bolts 40, see Fig. 5, with interposition of a sealing gasket at 41. The valve element 35 is firmly held to its seat by a follower 42 having an axial stud 43 which is engaged in a socket 45 in the cover piece 38 and which is subject to the action of a helical compression spring 46. In the face of the valve seat 37 are three radially arranged ports 50, 51, 52 (see Fig. 2), whereof the central one communicates with an exhaust duct having horizontal and upward branches 53, 54 in the housing 23, the last mentioned branch leading directly to the exterior. The other two ports 51, 52 respectively, communicate with passages 55, 56 in the valve body leading to the ducts 20, 21 which terminate at 18 and 19 at the opposite ends of the cylinder 10. The valve element 35 has an arcuate recess 35a (see Figs. 3, 6, and 7) whereof the circumferential extent is such as to be capable of spanning two of the ports 50, 51, 52 at a time. Normally the valve element 35 occupies the neutral position in which it is illustrated in Figs. 3 and 6 with all parts of the reverse gear quiescent in the relation shown in Fig. 1. Upon shifting of the valve element 35 to the position of Fig. 7, pressure-fluid will be permitted to flow from the hollow of the cap 38 through the port 51 of the communicating ducts 55, 20 and port 18 to the left-hand end of the cylinder 10, while the opposite end of said cylinder exhausts by way of the port 19, ducts 21, 56, port 52, the hollow 35a of the valve member 35, port 50 and ducts 53, 54. Movement of the valve element 35 in the opposite direction from that shown in Fig. 7 will result in admission of pressure-fluid to the right-hand end of the cylinder 10 by way of the port 52, ducts 56, 21 and the cylinder port 19, and in the concurrent exhausting of the left-hand end of said cylinder by way of the port 18, ducts 20, 55, port 51, the recess 35a of said valve element, port 50, and ducts 53, 54. The performance of the gear after shifting of the valve element 35 in either direction as just explained, will be after a manner well understood in the art and need not therefore be described herein.

In order to adapt the control unit 22 to the purposes of our invention, we have provided its housing 23 with two longitudinally-extending parallel passages 60 and 61, which, at the center of said housing, are connected by a vertical bore or transverse passage 62 wherein is disposed a small check valve 63. The closure disc 64 of the check valve 63 is arranged to cooperate with a seat 65 in interrupting communication between the two passages 60 and 61 under certain conditions later on explained. Normally, the check valve 63 is closed as shown, but will automatically open to allow flow of pressure-fluid to the cylinder 10 during ordinary operations of the gear. From Fig. 4 it will be noted that the supply pipe 33 for the pressure-fluid is connected into one end of the passage 60 whereof the other end is closed by a screw plug 66, and from Figs. 2, 3 and 4 that a deviating passage with vertical and horizontal branches 67 and 68, 69 leads from the duct 61 to the hollow or cavity of the cap 38 which encloses the valve element 35 and which is accordingly in constant communication with the supply source of the pressure-fluid. For the purposes of storing a reserve supply of pressure-fluid to enable emergency operations of the reverse gear in the event that the supply pipe 33 is broken or the regular source of supply fails, we have, in accordance with our invention, provided a reservoir 70, see Fig. 1. This reservoir 70 may be formed as shown by welding a bell to the rear head 71 of the cylinder 10 in axial alignment with the latter. A pipe 72 leading from the top of the reservoir 70 connects into one end of the passage 61, the other end whereof is closed by a screw plug 73. Thus the reservoir 70 is normally in communication, through the pipe 72 and the passages 61, 62 and 60 in the housing 23 of the unit 22, with the fluid-pressure supply pipe 33. However, in the event of either of the contingencies mentioned above, it will be apparent that the check valve 63 will remain permanently closed through drop of pressure in the duct 60 and thus trap the pressure-fluid in the reservoir 70, the quantity trapped being thus made available for use in emergencies. The capacity of the reservoir 70 is in practice such as to insure a supply of pressure fluid for at least two emergency operations of the gear. The cock shown at 75 serves as a means whereby the reservoir 70 may be relieved from time to time of condensation accumulation. It will be observed from Fig. 4 that the arrangement of the passages 60 and 61 permits reversal of the pipes 33 and 72 so that the control unit 22 may be mounted at the opposite side of the locomotive, if desired. When so used, the pipe 33 will be connected into that end of the duct 60 now occupied by the screw plug 66, and the pipe 72 connected into that end of the duct 61 now occupied by the screw plug 73, said plugs being of course correspondingly reversed in position to suit.

Having thus described our invention, we claim:

1. In a power reverse gear for steam locomotives and the like, a double-acting cylinder; control means for selectively controlling flow of pressure-fluid from a supply source to the opposite ends of the cylinder; a reservoir normally in communication with the pressure fluid supply source; and means incorporated in said control means automatically operative in the event of failure of the supply source, to trap pressure-fluid in the reservoir for availability in a number of subsequent emergency operations of the gear.

2. A power reverse gear according to claim 1, wherein the control means comprises a housing having an internal hollow, a number of passages which communicate with each other and with the hollow as well as with the supply source of the pressure-fluid and with the reservoir, and ducts leading from ports in a valve seat within the hollow to opposite ends of the actuating cylinder; wherein the control means also comprises a valve member which normally closes both of the aforesaid ports but which is movable on the seat to uncover one or the other of the ports to permit flow of pressure-fluid from said hollow to the corresponding end of the cylinder; and wherein the trapping means is in the form of a check valve which is interposed in one of the aforesaid passages.

3. In a power reverse gear for steam locomotives and the like, a double-acting cylinder; a reservoir for an emergency supply of pressure-fluid; and control means with a casing having therein a cavity, a pair of parallel ducts one in communication with the main source of pressure-fluid supply and the other in communication with the reservoir and a crosswise passage connecting the two ducts and the cavity, a movable control member within the cavity whereby communication may be established selectively between the crosswise passage and the opposite ends of the cylinder, and a check valve interposed in the passage between the two ducts, said valve normally permitting flow of pressure-fluid from the main source of supply to the reservoir but closing automatically in the event of failure of the main supply.

CARLETON K. STEINS.
HARRY A. HOKE.

REFERENCES CITED

The following references are of record in the file of this patent:

UNITED STATES PATENTS

| Number | Name | Date |
|---|---|---|
| 583,277 | Boyden | May 25, 1897 |
| 1,469,585 | McCune | Oct. 2, 1923 |
| 1,980,504 | Seifferle | Nov. 13, 1934 |
| 2,011,751 | Campbell | Aug. 20, 1935 |
| 2,017,086 | Zouck | Oct. 15, 1935 |
| 2,030,039 | Hessian | Feb. 4, 1936 |
| 2,058,890 | Keen | Oct. 27, 1936 |
| 2,072,410 | Shannon et al. | Mar. 2, 1937 |
| 2,290,983 | McClure | July 28, 1942 |